UNITED STATES PATENT OFFICE 2,564,958

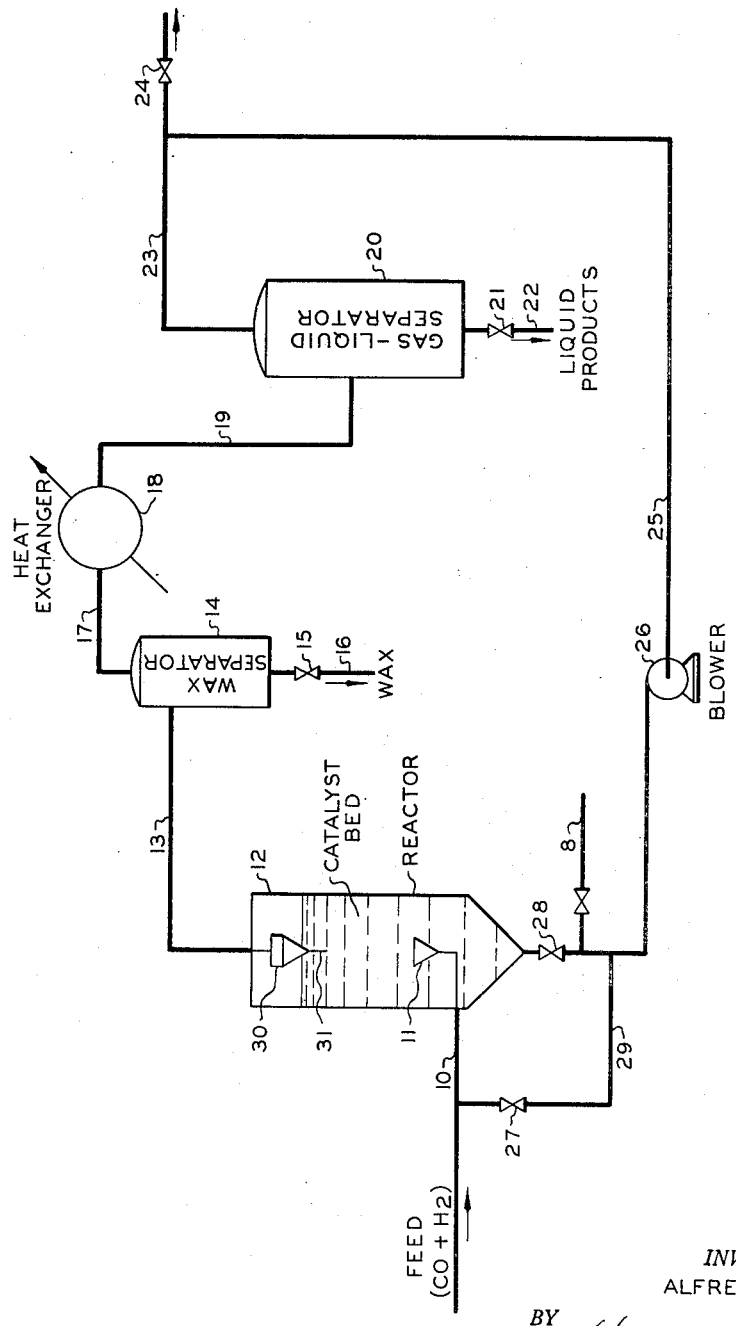

FISCHER-TROPSCH PROCESS FOR THE SYNTHESIS OF HYDROCARBONS

Alfred Clark, Bartlesville, Okla., assignor to Phillips Petroleum Company, a corporation of Delaware Application June 21, 1948, Serial No. 34,212

3 Claims. (Cl. 260—449.6)

This invention relates to the catalytic synthesis of hydrocarbons and/or oxygen-containing organic compounds from carbon monoxide and hydrogen. In one aspect this invention relates to a process for the catalytic synthesis of hydrocarbons from carbon monoxide and hydrogen wherein the regeneration of the synthesis catalyst is effected in the synthesis reactor. This invention is particularly useful for simultaneously effecting a hydrocarbon synthesis reaction and a regeneration of the synthesis catalyst in the synthesis reactor. The terms "regeneration" and "reactivation" as used herein are synonymous.

The Fischer-Tropsch reaction for the catalytic synthesis of hydrocarbons and oxygenated organic compounds is well known, and it has been observed repeatedly that during the synthesis the activity of the catalyst declines. The decline in activity appears to be due, at least in part, to accumulation of wax-like reaction products on the catalyst surface but my invention is not limited to this explanation or theory. In accordance with previous practice, the synthesis catalysts have been regenerated either by removal from the synthesis zone or by interruption of the synthesis reaction and then by contacting the catalyst with hydrogen, or gases containing large proportions of hydrogen, at temperatures higher than the synthesis temperature. These procedures have one or more of the disadvantages of requiring separate regenerators, intermittent shut-downs of synthesis reactors, use of stand-by reactors and other costly equipment and methods of operation.

It is an object of this invention to provide a novel method for the regeneration of hydrocarbon synthesis catalysts. It is also an object of this invention to regenerate hydrocarbon synthesis catalysts without removing the catalyst from the synthesis reactor. It is a further object of this invention to regenerate a portion of a hydrocarbon synthesis catalyst in one part of a synthesis reactor while simultaneously using another portion of the catalyst to effect a hydrocarbon synthesis reaction in another part of the reactor. Further and additional objects will appear from the description that follows.

My invention overcomes the disadvantages pointed out above by permitting the synthesis reaction and the catalyst regeneration to be conducted simultaneously in the same reactor. The invention is chiefly applicable to that type of contacting known as "fluidized-fixed-bed" contacting in which the reactant gas is passed upwardly through a bed of finely divided catalyst at such a velocity that the catalyst is thoroughly agitated and suspended in the upward-flowing gases but still remains in the reactor. According to the invention, the synthesis gas which comprises carbon monoxide and hydrogen is introduced into the catalyst bed at a point above the bottom of the bed. The effluent from the reactor is treated by conventional methods to recover the desired hydrocarbon and other organic products which are usually those products heavier than ethane. The remaining gaseous material which contains a large proportion of hydrogen and little or no carbon monoxide is recycled, at least in part, to the synthesis reactor and is introduced at the bottom of the catalyst bed to regenerate the catalyst below the synthesis gas inlet. Thus the reactor may be considered to comprise two zones in free communication with each other, viz., that portion above the synthesis gas inlet being a synthesis zone and that portion below being a catalyst regeneration zone. Since both the synthesis gas and the recycle or regeneration gas are introduced at catalyst-fluidizing velocities, the catalyst continually passes back and forth from one zone to the other, thus making possible a continuous regeneration.

Although my invention is primarily directed to regeneration of reduced iron oxide catalysts, it may also be applied to other Fischer-Tropsch catalysts that may be used in the fluid-type process and that are capable of being regenerated by contact with hydrogen, such as reduced nickel.

According to my invention, the synthesis gas inlet is preferably positioned in the reactor so that the volume of fluidized catalyst in the synthesis zone is about 5 to 15 times the volume of fluidized catalyst in the regeneration zone. When a reduced iron oxide catalyst is used, the following preferred conditions are maintained in the synthesis zone: temperature, 295–325° C.; pressure, 5–30 atmospheres; synthesis gas space velocity, 1500–3000 volumes of synthesis gas per volume of catalyst in the synthesis zone per hour. The following conditions are preferred for the regeneration zone: temperature and pressure, approximately the same as in the synthesis zone; space velocity of regeneration gas, approximately 2 to 4 times greater than the space velocity of the fresh synthesis gas. The mol ratio of hydrogen to carbon monoxide in the synthesis reaction zone is usually about 2:1, although a ratio from 1:1 to 3:1, preferably 1.8:1 to 2.2:1, may be used.

One specific embodiment of this invention is shown in the single figure which discloses my preferred method of carrying out my invention. It will be obvious to one skilled in the art that rearrangements of the apparatus may be made and that other standard equipment such as compressors, valves, etc. may be added or substituted for equipment shown on the drawing without going beyond the scope of my invention. The synthesis gas containing hydrogen and carbon monoxide is charged to the reactor 12 via line 10 and distributor cone 11 at a space velocity of 2500 volumes of synthesis gas per volume of catalyst per hour at a point above the bottom of the reactor such that the volume of fluidized catalyst above the point of introduction is ten times the volume of fluidized catalyst below that point. The reaction is effected in the presence of a finely divided reduced iron oxide catalyst at about 320° C. and 20 atmospheres pressure. The molar ratio of hydrogen to carbon monoxide in the gases in the synthesis zone which includes the fresh synthesis gas and the recycled hydrogen-rich gas is substantially 2:1. Line 8 is an inlet for optional addition of hydrogen from an external source to supplement the hydrogen content of the recycled gas. The reaction effluent, containing hydrocarbons of varying molecular weight, oxygenated products, unreacted hydrogen, inerts such as steam and carbon dioxide, and a small amount of carbon monoxide, and some entrained catalyst are removed from the reaction zone to a cyclone separator 30. The catalyst is separated from the effluent and returned to the catalyst mass while the effluent is removed from the reactor via line 13 to wax separator 14 where waxy products are removed via valve 15 and line 16. Through line 17 the normally liquid and gaseous products are led to heat exchanger 18 and thence via line 19 to a liquid-gas separator 20 where the gases containing a relatively high percentage of hydrogen pass overhead in line 23, and the liquid phase containing the higher boiling products are drawn off through valve 21 via line 22. The liquid products withdrawn via line 22 contain two phases, viz. an aqueous phase and a hydrocarbon phase, which have not been shown for the sake of simplicity and which are readily separated from each other by liquid-liquid separation. The aqueous phase is made up mainly of organic oxygenated compounds such as acids, alcohols, aldehydes and ketones, and the hydrocarbon phase essentially consists of saturated and unsaturated hydrocarbons which are liquid at normal conditions. A portion of the gas from separator 20 which is not required to be recycled is removed through valve 24 to suitable disposal means not shown or if desired this gas may be led to suitable means for recovery of the $C_3$ and lighter fractions. A substantial portion of this off-gas, amounting in volume to about three times that of the feed gas entering reactor 12 via line 10, is recycled via line 25, blower 26, and valve 28 and thence fed into the bottom of the reactor and this hydrogen-rich recycle gas regenerates the catalyst below the point of introduction of the feed gas. The conversion of carbon monoxide is maintained at between 95 and 100 per cent. The recycle gas contains very small amounts of carbon monoxide and is rich in hydrogen, being about 40-50 volume per cent hydrogen. If desired, a portion of the recycle gas may be taken off by line 29 and valve 27 and mixed with the synthesis feed gas and thence passed through line 10 into the reactor.

It will be appreciated by those skilled in the art that the regeneration and reaction zones within the reactor should be properly proportioned to carry out satisfactorily the desired functions. For example in a conventional process wherein the reaction is shut down to allow for regeneration, at the rate of one hour of regeneration for every ten hours of reaction, the reaction zone for effecting equivalent conversion according to this invention may be about 10 times the volume of the regeneration zone.

It will be readily apparent that this invention utilizes a reactor of relatively simple design. In many cases, the invention can be put into practice by effecting only minor changes in reactors already available. The synthesis reaction zone of the reactor may be cooled by conventional means, such as by providing cooling tubes through which a coolant, such as water, is circulated. Such tubes preferably do not extend into the regeneration zone.

*Specific example*

The synthesis of gasoline and other hydrocarbons is conducted by contacting a gas comprising 66 volume per cent hydrogen and 34 per cent carbon monoxide with a 60-200 mesh reduced iron oxide catalyst. The catalyst is prepared by fusing iron oxide, adding minor amounts of potassium nitrate and alumina to the molten oxide, cooling, crushing, and reducing with hydrogen. The synthesis temperature is 320° C. The pressure is 300 p. s. i. The space velocity of the fresh synthesis gas is 2500 volumes per volume of catalyst per hour.

The effluent from the synthesis reactor is passed to a partial condenser, in which propane and heavier materials are recovered in the liquid state. The uncondensed gas has approximately the following composition:

| | Volume per cent |
|---|---|
| $H_2$ | 46 |
| CO | 1 |
| $CO_2$ | 15 |
| $CH_4$ | 20 |
| $C_2H_6$ | 10 |
| Olefins | 8 |
| | 100 |

This gas is recycled and enters the synthesis reactor through a bottom inlet, the fresh synthesis gas being charged through an inlet above the recycle gas inlet. The volume of reaction space above the synthesis gas inlet is about 10 times that below the synthesis gas inlet. The volume ratio of recycle to fresh synthesis gas is about 3:1.

At the end of 300 hours continuous operation, the carbon monoxide conversion is 97 per cent. At the end of 300 hours operation under the above conditions, in a system employing a conventional reactor without the continuous regeneration means of this invention, the carbon monoxide conversion is about 91 per cent.

From the above example it is readily apparent that my invention is an improvement over the prior art methods of carrying out a hydrocarbon synthesis, and numerous variations of my invention will be apparent to those skilled in the art without going beyond the scope of my process and disclosure.

I claim:

1. The improved method for synthesizing organic compounds which comprises contacting a finely divided reduced iron oxide synthesis catalyst with a stream of upward flowing fresh and recycled residual synthesis gas comprising hydrogen and carbon monoxide in a mol ratio of 1:1 to 3:1 in a vertical reaction chamber free from obstructions and having a synthesis reaction zone superposed above the sole catalyst reactivation zone in said reaction chamber and in free communication therewith, said synthesis reaction zone and said catalyst reactivation zone forming a single unitary uninterrupted fluidized catalyst bed with catalyst particles in said bed continuously passing back and forth freely between said reaction zone and said reactivation zone, said synthesis reaction zone being at least five times the volume of said catalyst reactivation zone, maintaining said fluidized catalyst bed at a temperature of 295 to 325° C. and a pressure of 5 to 30 atmospheres, introducing fresh synthesis gas to said chamber at a space velocity of 1500 to 3000 volumes per volume of catalyst in the synthesis zone per hour at a point intermediate the top and bottom of the fluidized catalyst bed, said point being at the bottom of said synthesis reaction zone, effecting the synthesis reaction in said reaction chamber above the point of introduction of said fresh synthesis gas in the presence of fresh synthesis gas plus residual reactivation gas rising from the catalyst reactivation zone therebelow, separating from the synthesis reaction effluent organic compounds containing more than 2 carbon atoms per molecule, recycling at least a portion of the remainder of the effluent from said reaction chamber to the bottom thereof as a gas rich in hydrogen and carbon dioxide and at a space velocity from 2 to 4 times that of the fresh synthesis gas, reactivating synthesis catalyst with said recycled effluent in said reaction chamber below the point of introduction of said fresh synthesis gas, passing said reactivated catalyst without further reactivation to said synthesis reaction by said continuous free passing of catalyst particles back and forth in said single fluidized bed, and continuing said synthesis reaction and catalyst reactivation for at least 300 hours without substantial reduction of the carbon monoxide conversion and without other catalyst reactivation than that described herein.

2. A process according to claim 1 wherein the volume of the synthesis reaction zone is from five to fifteen times the volume of the reactivation zone.

3. A process according to claim 1 wherein the volume of the synthesis reaction zone is ten times the volume of the reactivation zone.

ALFRED CLARK.

REFERENCES CITED

The following references are of record in the file of this patent:

UNITED STATES PATENTS

| Number | Name | Date |
|---|---|---|
| 2,250,421 | Riblett | July 22, 1941 |
| 2,417,164 | Huber | Mar. 11, 1947 |
| 2,447,505 | Johnson | Aug. 24, 1948 |
| 2,461,570 | Roberts | Feb. 15, 1949 |